United States Patent
Ishikawa (10) Patent No.: US 8,782,108 B2
(45) Date of Patent: *Jul. 15, 2014

(54) RANDOM NUMBER GENERATING METHOD AND RANDOM NUMBER GENERATING APPARATUS

(75) Inventor: Hisashi Ishikawa, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

This patent is subject to a terminal disclaimer.

(21) Appl. No.: 13/013,770

(22) Filed: Jan. 25, 2011

(65) Prior Publication Data

US 2011/0119321 A1    May 19, 2011

Related U.S. Application Data

(63) Continuation of application No. 11/149,133, filed on Jun. 10, 2005, now Pat. No. 7,895,251.

(30) Foreign Application Priority Data

Jun. 11, 2004    (JP) .................................. 2004-174607

(51) Int. Cl.
    *G06F 1/02*    (2006.01)
(52) U.S. Cl.
    USPC ........................................................ 708/252
(58) Field of Classification Search
    USPC ........................................................ 708/252
    See application file for complete search history.

(56) References Cited

U.S. PATENT DOCUMENTS

| | | | |
|---|---|---|---|
| 5,805,738 A | 9/1998 | Kaburagi et al. | |
| 6,339,781 B1 | 1/2002 | Sasaki | |
| 6,519,366 B1 * | 2/2003 | Kaburagi | 382/251 |
| 7,191,205 B2 * | 3/2007 | Nakaya | 708/711 |
| 7,426,528 B2 | 9/2008 | Denk | |
| 7,895,251 B2 * | 2/2011 | Ishikawa | 708/252 |
| 2003/0236803 A1 | 12/2003 | Williams | |
| 2004/0078401 A1 | 4/2004 | Hilton | |

FOREIGN PATENT DOCUMENTS

| | | |
|---|---|---|
| JP | 6-276067 A | 9/1994 |
| JP | 10-42132 A | 2/1998 |

* cited by examiner

*Primary Examiner* — Chuong D Ngo
(74) *Attorney, Agent, or Firm* — Fitzpatrick, Cella, Harper & Scinto (57) ABSTRACT

A mask circuit (2) masks a bit sequence of K bits by a predetermined bit pattern. An EXOR circuit (3) EXORs the masked bit sequence. An inverter (9) controls inversion/non-inversion of values of bits of a bit sequence which includes a bit value indicating the EXOR result in a result obtained by shifting the bit sequence of K bits held in a shift register (1), in accordance with a designated bit value in a pattern table (14). A bit sequence as the control result is output as a random number expressed by K bits.

9 Claims, 5 Drawing Sheets

| cycle | shift register | x counter | before | detector | after |
|---|---|---|---|---|---|
| 1 | 1111 | 0 | 1111 | 0 | 1111 |
| 2 | 1110 | 1 | 0001 | 0 | 0001 |
| 3 | 1101 | 0 | 1101 | 0 | 1101 |
| 4 | 1010 | 1 | 0101 | 0 | 0101 |
| 5 | 0101 | 0 | 0101 | 1 | 1010 |
| 6 | 1011 | 1 | 0100 | 0 | 0100 |
| 7 | 0110 | 0 | 0110 | 0 | 0110 |
| 8 | 1100 | 1 | 0011 | 0 | 0011 |
| 9 | 1001 | 0 | 1001 | 0 | 1001 |
| 10 | 0010 | 1 | 1101 | 0 | 1101 |
| 11 | 0100 | 0 | 0100 | 0 | 0100 |
| 12 | 1000 | 1 | 0111 | 0 | 0111 |
| 13 | 0001 | 0 | 0001 | 0 | 0001 |
| 14 | 0011 | 1 | 1100 | 0 | 1100 |
| 15 | 0111 | 0 | 0111 | 0 | 0111 |
| 16 | 1111 | 1 | 0000 | 0 | 0000 |
| 17 | 1110 | 0 | 1110 | 0 | 1110 |
| 18 | 1101 | 1 | 0010 | 0 | 0010 |
| 19 | 1010 | 0 | 1010 | 0 | 1010 |
| 20 | 0101 | 1 | 1010 | 1 | 0101 |
| 21 | 1011 | 0 | 1011 | 0 | 1011 |
| 22 | 0110 | 1 | 1001 | 0 | 1001 |
| 23 | 1100 | 0 | 1100 | 0 | 1100 |
| 24 | 1001 | 1 | 0110 | 0 | 0110 |
| 25 | 0010 | 0 | 0010 | 0 | 0010 |
| 26 | 0100 | 1 | 1011 | 0 | 1011 |
| 27 | 1000 | 0 | 1000 | 0 | 1000 |
| 28 | 0001 | 1 | 1110 | 0 | 1110 |
| 29 | 0011 | 0 | 0011 | 0 | 0011 |
| 30 | 0111 | 1 | 1000 | 0 | 1000 |

… 1

RANDOM NUMBER GENERATING METHOD AND RANDOM NUMBER GENERATING APPARATUS

This application is a continuation of U.S. application Ser. No. 11/149,133, filed Jun. 10, 2005(allowed), the contents of which are incorporated herein by reference.

FIELD OF THE INVENTION

The present invention relates to a technique for generating a random number.

BACKGROUND OF THE INVENTION

As one of random number generating methods using logical operations, an L-bit length random number method called an M-sequence is known. This method uses an equation given by $x_N = x_{N-K} + x_{N-L}$, and generates a 1-bit random number using only numerals 0 and 1. Since this random number has a logically maximum length for specific K upon determining K, it is called an M-sequence using M for Maximum Length. If the internal state $(x_{N-K}, x_{N-K+1}, \ldots, x_{N-1})$ of K bits is given, the values of $x_n, x_{N+1}, \ldots$ are uniquely determined and, hence, there are $2^K$ different internal states. The number of internal states is $2^K - 1$ except for a self-evident solution $x_N = 0$ of the above formula, and the M-sequence has it as a length. The circuit is configured by a shift register, and an EXOR (exclusive OR) which feeds back an intermediate value of the shift register, and the feedback configuration is determined in correspondence with a primitive polynomial to be implemented.

As described above, since the conventional random number generating method uses an LFSR (Linear Feedback Shift Register), neighboring numerical values have correlation and a unique spectrum. Especially, middle and low frequency ranges have peaks, and if this method is used in image processing or the like, it poses a problem of image quality disturbance.

When a K-bit LFSR is used, its length is $2^K - 1$, and it is difficult to generate random numbers of a plurality of lengths from a single random number generator. Since only one primitive polynomial can be implemented, a random number pattern is also limited to one.

It is impossible to generate an identical random number sequence in the reverse direction, and the use application of the method is limited.

SUMMARY OF THE INVENTION

The present invention has been made to solve the aforementioned problems, and has as its object to provide a technique for generating an arbitrary M-sequence random number of K bits or less.

It is another object of the present invention to generate a visibly satisfactory random number including a small number of low-frequency components.

In order to achieve an object of the present invention, for example, a random number generating method of the present invention comprises the following arrangement.

That is, a random number generating method for generating a random number expressed by K bits, comprising:

a mask step of masking a bit sequence of K bits held in a memory by a predetermined bit pattern;

an operation step of making an exclusive-OR operation of the bit sequence masked in the mask step, and setting a bit value indicating the exclusive-OR operation result to be included in a result obtained by shifting the bit sequence of K bits held in the memory in a predetermined direction;

a first inversion control step of controlling inversion/non-inversion of bit values in the bit sequence by the operation step in accordance with a designated bit value in the predetermined bit pattern; and an output step of outputting the bit sequence as the processing result in the first inversion control step as a random number expressed by K bits.

In order to achieve an object of the present invention, for example, a random number generating method of the present invention comprises the following arrangement.

That is, a random number generating method for generating a random number expressed by K bits, comprising:

a mask step of masking a bit sequence of (K−1) bits held in a memory by a predetermined bit pattern;

a first operation step of making an exclusive-OR operation of the bit sequence masked in the mask step, and setting a bit value indicating the exclusive-OR operation result to be included in a result obtained by shifting the bit sequence of (K−1) bits held in the memory in a predetermined direction;

a selection step of selecting a bit value in the predetermined bit pattern in accordance with a position of a pixel to be processed on an image;

an inversion control step of controlling a process for inverting the bit value selected in the selection step in accordance with the position of the pixel to be processed on the image; and an output step of outputting a bit sequence obtained by adding a bit of the processing result in the inversion control step to a head of the bit sequence by the first operation step as a random number expressed by K bits.

In order to achieve an object of the present invention, for example, a random number generating apparatus of the present invention comprises the following arrangement.

That is, a random number generating apparatus for generating a random number expressed by K bits, comprising:

a register for holding a bit sequence of K bits;

mask means for masking the bit sequence held in the register by a predetermined bit pattern;

shift means for shifting the bit sequence held in the register in a predetermined direction;

operation means for making an exclusive-OR operation of the bit sequence masked by the mask means, and setting a bit value indicating the exclusive-OR operation result to be included in the bit sequence in the register, which is shifted by the shift means;

first inversion control means for controlling a process for inverting bit values in the bit sequence by the operation means in accordance with a designated bit value in the predetermined bit pattern; and output means for outputting the bit sequence as the processing result of the first inversion control means as a random number expressed by K bits.

In order to achieve an object of the present invention, for example, a random number generating apparatus of the present invention comprises the following arrangement.

That is, a random number generating apparatus for generating a random number expressed by K bits, comprising:

a register for holding a bit sequence of (K−1) bits;

mask means for masking the bit sequence held in the register by a predetermined bit pattern;

shift means for shifting the bit sequence held in the register in a predetermined direction;

first operation means for making an exclusive-OR operation of the bit sequence masked by the mask means, and setting a bit value indicating the exclusive-OR operation result to be included in the bit sequence in the register, which is shifted by the shift means;

second operation means for calculating a bit value determined in accordance with a bit value depending on whether or not a bit sequence for a predetermined number of bits in the bit sequence by the first operation means is a specific bit sequence, and a bit value determined in accordance with a designated bit value in the predetermined bit pattern; and output means for outputting a bit sequence obtained by adding the bit calculated by the second operation means to a head of the bit sequence calculated by the first operation means as a random number expressed by K bits.

In order to achieve an object of the present invention, for example, a random number generating apparatus of the present invention comprises the following arrangement.

That is, a random number generating apparatus for generating a random number expressed by K bits, comprising:

a first register for holding a bit sequence of K bits;

first selection means for selecting a predetermined bit from the bit sequence held in the first register;

first shift means for shifting the bit sequence held in the first register in a predetermined direction;

first operation means for making an exclusive-OR operation of a bit sequence selected by the first selection means, and setting a bit value indicating the exclusive-OR operation result to be included in the bit sequence in the first register, which is shifted by the first shift means;

inversion control means for controlling a process for inverting bit values in the bit sequence by the first operation means in accordance with a bit value determined depending on whether a bit sequence for a predetermined number of bits in the bit sequence by the first operation means is a specific bit sequence, and a position of a pixel to be processed on an image; and output means for outputting the bit sequence as the processing result of the inversion control means as a random number expressed by K bits.

In order to achieve an object of the present invention, for example, a random number generating apparatus of the present invention comprises the following arrangement.

That is, a random number generating apparatus for generating a random number expressed by K bits, comprising:

a first register for holding a bit sequence of (K−1) bits;

first selection means for selecting a predetermined bit from the bit sequence held in the first register;

first shift means for shifting the bit sequence held in the first register in a predetermined direction;

first operation means for making an exclusive-OR operation of a bit sequence selected by the first selection means, and setting a bit value indicating the exclusive-OR operation result to be included in the bit sequence in the first register, which is shifted by the first shift means;

selection means for selecting a bit value in a predetermined bit pattern in accordance with a position of a pixel to be processed on an image;

inversion control means for controlling a process for inverting a value of the bit selected by the selection means in accordance with the position of the pixel to be processed on the image; and output means for outputting a bit sequence obtained by adding the bit as the processing result of the inversion control means to a head of the bit sequence by the first operation means as a random number expressed by K bits.

In order to achieve an object of the present invention, for example, a random number generating method of the present invention comprises the following arrangement.

That is, a random number generating method for generating a random number expressed by K bits, comprising:

a first selection step of selecting a predetermined bit from a bit sequence of K bits held in a first register;

a first shift step of shifting the bit sequence held in the first register in a predetermined direction;

a first operation step of making an exclusive-OR operation of a bit sequence selected in the first selection step, and setting a bit value indicating the exclusive-OR operation result to be included in the bit sequence in first register, which is shifted in the first shift step;

an inversion control step of controlling a process for inverting bit values in the bit sequence by the first operation step in accordance with a bit value determined depending on whether a bit sequence for a predetermined number of bits in the bit sequence by the first operation step is a specific bit sequence, and a position of a pixel to be processed on an image; and an output step of outputting the bit sequence as the processing result of the inversion control step as a random number expressed by K bits.

In order to achieve an object of the present invention, for example, a random number generating method of the present invention comprises the following arrangement.

That is, a random number generating method for generating a random number expressed by K bits, comprising:

a first selection step of selecting a predetermined bit from a bit sequence of (K−1) bits held in a first register;

a first shift step of shifting the bit sequence held in the first register in a predetermined direction;

a first operation step of making an exclusive-OR operation of a bit sequence selected in the first selection step, and setting a bit value indicating the exclusive-OR operation result to be included in the bit sequence in the first register, which is shifted in the first shift step;

a selection step of selecting a bit value in a predetermined bit pattern in accordance with a position of a pixel to be processed on an image;

an inversion control step of controlling a process for inverting a value of the bit selected in the selection step in accordance with the position of the pixel to be processed on the image; and an output step of outputting a bit sequence obtained by adding the bit as the processing result of the inversion control step to a head of the bit sequence by the first operation step as a random number expressed by K bits.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments in which a random number generating apparatus of the present invention is applied to a random number generator will be described in detail hereinafter with reference to the accompanying drawings. Of course, the following embodiments provide disclosures for facilitating implementations by those who are skilled in the art of the present invention, and are only some embodiments included in the technical scope of the present invention defined by the appended claims. Therefore, as can be apparent to those who are skilled in the art, even embodiments which are not directly described in the present specification are included in the technical scope of the present invention as long as they have a common technical idea.

Note that a plurality of embodiments will be described for the sake of convenience. As is easily understood by those who are skilled in the art, not only these embodiments are individually achieved as inventions, but also an invention is achieved by combining a plurality of embodiments as needed.

First Embodiment

Figure 1:
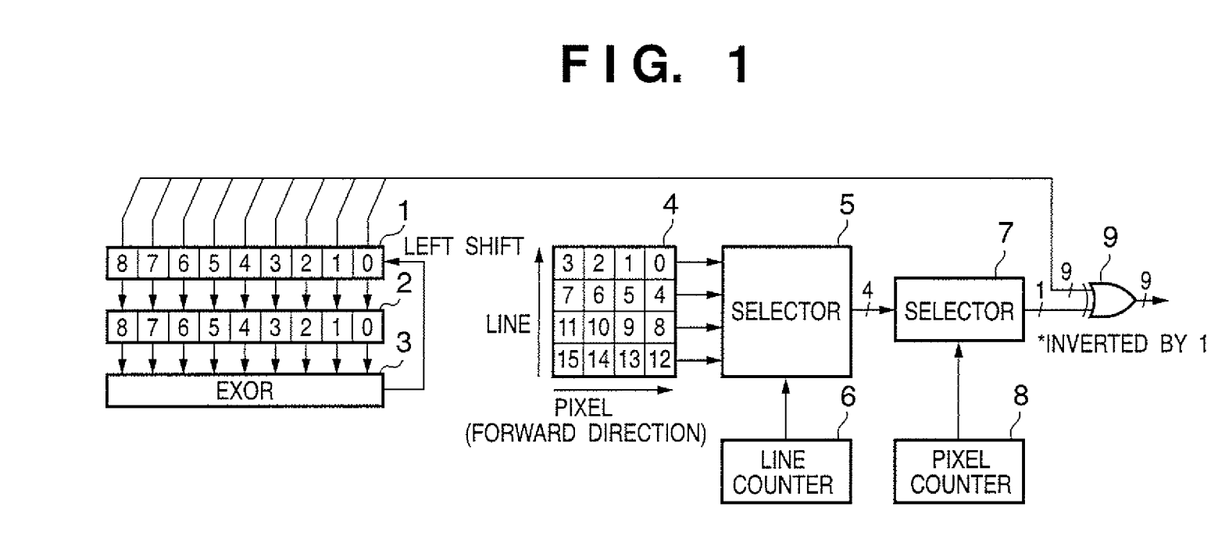
FIG. 1 is a block diagram showing the basic arrangement of a random number generator according to the first embodiment of the present invention.

FIG. 1 is a block diagram showing the basic arrangement of a random number generator according to this embodiment. This embodiment will exemplify a case wherein random numbers for all pixels that form an image are to be generated.

Referring to FIG. 1, reference numeral 1 denotes a shift register which can shift a bit sequence to be held in both the right and left directions; 2, a mask circuit which masks the bit sequence output from the shift register 1; 3, an EXOR circuit; 4, a pattern table; 5, a line direction selector; 6, a line counter; 7, a pixel direction selector; 8, a pixel counter; and 9, an inverter. In the following description, the number of bits of the shift register 1 is K (K=9 in FIG. 1), i.e., the random number generator that ranges a random number expressed by 9 bits will be explained. However, the gist of the following description is not limited to 9 bits.

The shift register 1 shifts the held bit sequence 1 bit to the left every time it generates a random number. The mask circuit 2 masks only predetermined bits of the bit sequence output from the shift register 1, and outputs them to the EXOR circuit 3. More specifically, the mask circuit 2 masks bits other than those which correspond to a primitive polynomial. For example, when the shift register 1 holds 9 bits "110010100" ("0" is held in a memory part with index 0, "0" in a memory part with index 1, "1" in a memory part with index 2, "0" in a memory part with index 3, "1" in a memory part with index 4, "0" in a memory part with index 5, "0" in a memory part with index 6, "1" in a memory part with index 7, and "1" in a memory part with index 8), and a random number based on a primitive polynomial $X^7+X+1$ is to be generated, the mask circuit 2 masks bits other than bits 6 and 0 (i.e., it computes a logical product of the shift register value and the mask value "001000001"), and outputs a bit sequence "000000000". When a random number based on primitive polynomial $X^9+X^4+1$ is to be generated, the mask circuit 2 masks bits other than bits 8 and 3 (i.e., it computes a logical product of the shift register value and the mask value "100001000"), and outputs a bit sequence "100000000". The generated bit sequence is input to the EXOR circuit 3.

The EXOR circuit 3 calculates a feedback value with reference to the bit sequence received from the mask circuit 2. The EXOR circuit 3 executes the same process as a so-called parity bit generating circuit. That is, the EXOR circuit 3 counts the number of bits "1" in the bit sequence input from the mask circuit 2, and outputs as the feedback value 0 if the count is an even number or 1 if it is an odd number. This feedback value is input (fed back) to the lower bit (a position indicated by "0" in FIG. 1), as shown in FIG. 1. After the shift register 1 shifts the held bit sequence 1 bits to the left, it receives the feedback value at its lower bit. The shift register 1 outputs the held 9-bit bit sequence to the inverter 9.

Therefore, by changing the mask pattern, arbitrary primitive polynomials of K-th order or less can be realized.

The pattern table 4 is a memory that holds H bits in the vertical direction, and W bits in the horizontal direction. In FIG. 1, the pattern table 4 holds a total of 16 bits, i.e., 4 bits in the vertical direction, and 4 bits in the horizontal direction. The bit value of each bit is 0 or 1.

The line counter 6 is used to read out a pattern of the pattern table 4 corresponding to a line of an image to be processed. More specifically, the count value counted by the line counter 6 indicates a line of the pattern table 4 which corresponds to a line including a pixel to be processed. The count value of the line counter 6 is input to the selector 5. Let c be the count value of the line counter 6. Then, the selector 5 reads out bits held in respective grids of the c-th column, i.e., a bit sequence of 4 bits, and outputs it to the selector 7.

The pixel counter 8 is used to read out a pattern of the pattern table 4 corresponding to the horizontal position of a pixel to be processed. That is, the count value counted by the pixel counter 8 indicates the position of a pattern n line data of the pattern table 4 selected by the line counter 6 which corresponds to the pixel to be processed. The count value of the pixel counter 8 is input to the selector 7. Let f be the count value of the pixel counter 8. Then, the selector 7 reads out the f-th bit from the bit sequence of 4 bits output from the selector 5, and outputs it to the inverter 9.

More specifically, one of 16 bits held by the pattern table 4 is designated by the line counter 6 and pixel counter 8, and the designated bit is output to the inverter 9. In other words, the designated bit is determined by the position of the line to be processed, and that of the pixel to be processed in that line.

The inverter 9 refers to 1 bit output from the selector 7. If the referred bit value is 1, the inverter 9 inverts bit values which form the bit sequence of 9 bits output from the shift register 1, and externally outputs them; if the referred bit value is 0, the inverter 9 externally outputs the bit sequence of 9 bits output from the shift register 1 without any process. In this way, the inverter 9 outputs a random number expressed by 9 bits.

With the aforementioned process, one of 16 bits held by the pattern table 4 is determined in accordance with the position of the pixel to be processed, and inversion/non-inversion of the bit sequence held by the shift register 1 can be controlled in accordance with the determined bit value. In this way, the bit sequence held by the shift register 1 is two-dimensionally modulated. For example, when the pattern table 4 stores 16 bits "1010-0101-1010-0101", the low-frequency component of the random number generated by the shift register 1 is shifted toward the high-frequency side.

According to the random number generating method of this embodiment, the length of the random number to be generated is 2×(b $2^K$−1), i.e., twice the conventional length $2^K$−1, and a uniform random number with a large length can be generated.

With the above inversion operation, the random number value becomes 0 (when the random number value with all bits "1" is inverted) in some case. If 0 poses a problem, inversion when all the bits of the random number are "1" is inhibited, or such random number is substituted by data with all bits "1", thus generating the same uniform random numbers as the conventional ones. In order to generate the same random number sequence in the reverse direction, the shift direction of the shift register is reversed to replace the LSB position and the MSB position (the highest order position in case of K bits or less) of the mask.

Second Embodiment

Figure 2:
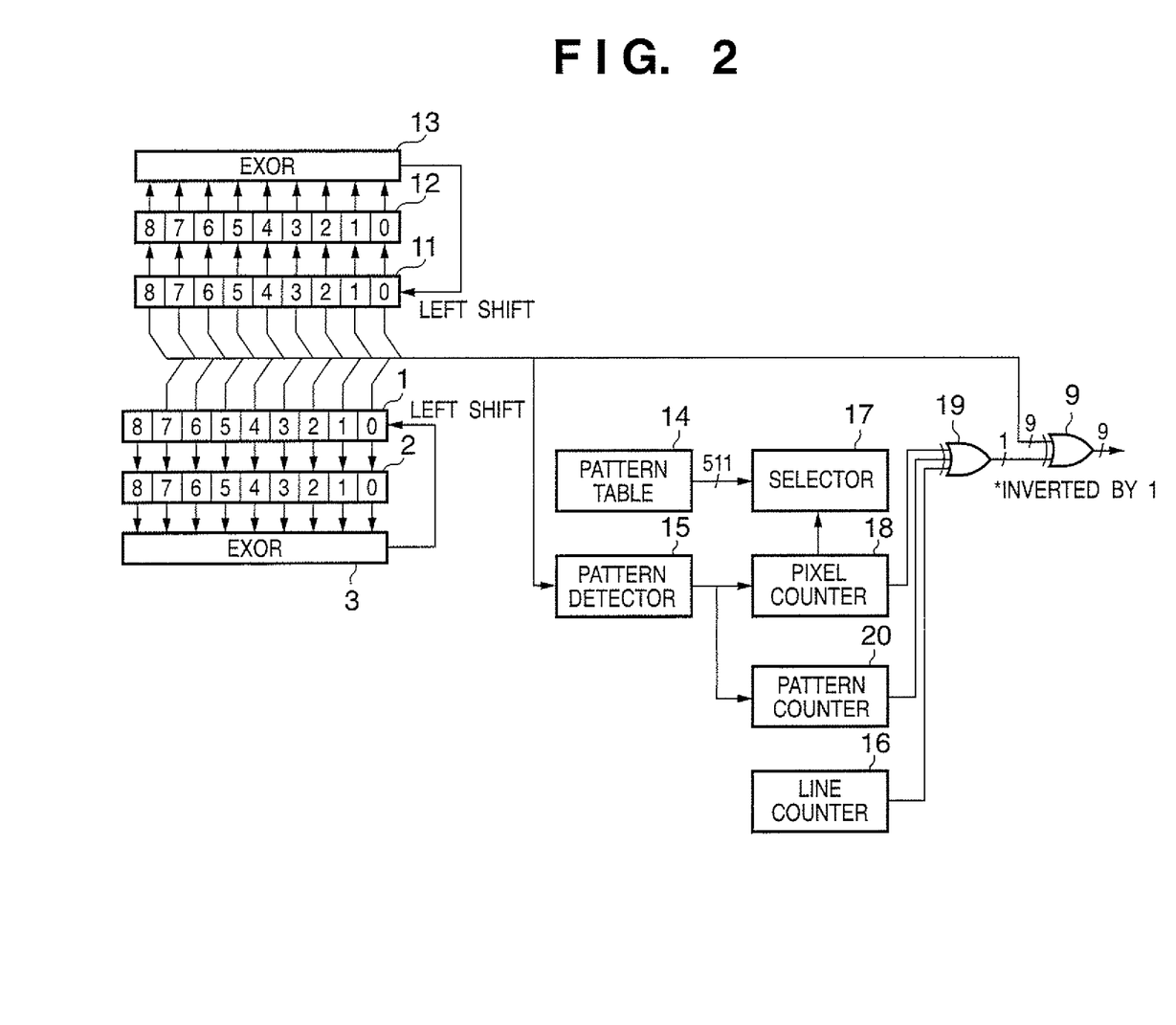
FIG. 2 is a block diagram showing the basic arrangement of a random number generator according to the second embodiment of the present invention.

FIG. 2 is a block diagram showing the basic arrangement of a random number generator according to this embodiment. Note that the same reference numerals in FIG. 2 denote the same parts as in FIG. 1, and a description thereof will be omitted. Referring to FIG. 2, reference numeral 11 denotes a shift register; 12, a mask circuit; 13, an EXOR circuit; 14, a pattern table; 15, a pattern detector; 16, a line counter; 17, a selector; 18, a pixel counter; 19, an EXOR circuit; and 20, a pattern counter.

The shift register 11, mask circuit 12, and EXOR circuit 13 are respectively the same as the shift register 1, mask circuit 2, and EXOR circuit 3, and operate, as described in the first embodiment. By setting a mask of the mask circuit 12 to be different from that of the mask circuit 2, a random number having a different sequence (primitive polynomial) from that generated by the shift register 1, mask circuit 2, and EXOR circuit 3 is generated. By loading the value of the shift register 11 to the shift register 1 at the end (or head) of the line, correlation between lines of a random number generated by the shift register 1, mask circuit 2, and EXOR circuit 3 can be eliminated.

The pattern table 14 stores patterns for the length ($2^K$−1) of M-sequence random numbers. In this embodiment, since K=9, the pattern table 14 stores patterns of bit sequences for 511 bits.

The pixel counter 18 is used to select the value of the pattern table 14 corresponding to the horizontal position of a pixel to be processed on an image.

The selector 17 selects one of 511-bit bit sequences held by the pattern table 14 in accordance with the value of the pixel counter 18, and outputs it to the EXOR circuit 19.

The pattern detector 15 refers to the bit sequence of 9 bits output from the shift register 1 or 11, and checks if this bit sequence is that of a specific pattern which is determined in advance. If the bit sequence of interest forms the specific pattern, the count value counted by the pixel counter 18 is reset to 0 and the count value of the pattern counter 20 is inverted.

The pattern counter 20 is a 1-bit counter, and always outputs the same count value (0 or 1) unless it receives an instruction from the pattern detector 15. As described above, when the pattern detector 15 detects a specific pattern, the pattern counter 20 inverts this count value. In this manner, an inversion pattern which uniquely corresponds to a random number sequence is input to the EXOR circuit 19 via the pixel counter 18 and selector 17.

The line counter 16 is a 1-bit counter, and inverts its count value for each line. Therefore, the inverted pattern is also inverted for each line.

Since the "bit sequence with a specific pattern which is determined in advance" is used to attain synchronization with the random number sequence, the pattern of the bit sequence is basically not limited. For example, in order to facilitate detection, a pattern with all bits=1 may be adopted. Alternatively, the pixel counter 18 may be configured as a ($2^K$−1)-ary counter to invert the value of the pattern counter by a carry of this counter. In this case, the pattern detector 15 is omitted.

The EXOR circuit 19 EXORs 1 bit as the output from the selector 17, 1 bit as the output from the pattern counter 20, and 1 bit as the output from the line counter 16, and outputs 1 bit as the EXOR result to the inverter 9. When this 1 bit as the EXOR result is 1, the inverter 9 inverts bits which form 9 bits from the shift register 1, and externally outputs inverted 9 bits. On the other hand, when 1 bit as the EXOR result of the EXOR circuit 19 is 0, the inverter 9 externally outputs 9 bits from the shift register 1 intact.

With the above inversion pattern setting, a random number having a spectrum (frequency characteristics) according to the use application can be generated.

When the mask pattern of the mask circuit 12 is matched with that of the mask circuit 2, correlation may be provided in the vertical direction, or random number sequences with different lengths may be generated. Alternatively, in order to improve the randomness, a random number generated by the shift register 11, mask circuit 12, and EXOR circuit 13 may be generated N times for respective lines, and may then be loaded to the shift register 1. Especially, after a random number is idly generated in correspondence with the number of bits of the shift register (or with the highest-order of a primitive polynomial), it may be loaded to the shift register 1, thus eliminating correlation between lines.

The pattern table 14 may have a two-dimensional structure to shape the spatial frequency. In this case, the line counter 16 is used to select a line of the pattern table 14 in synchronism with a random number generated by the shift register 11, mask circuit 12, and EXOR circuit 13. Note that the EXOR circuit 19 may have two inputs since inversion by the line counter 16 is not required.

Third Embodiment

Figure 3:
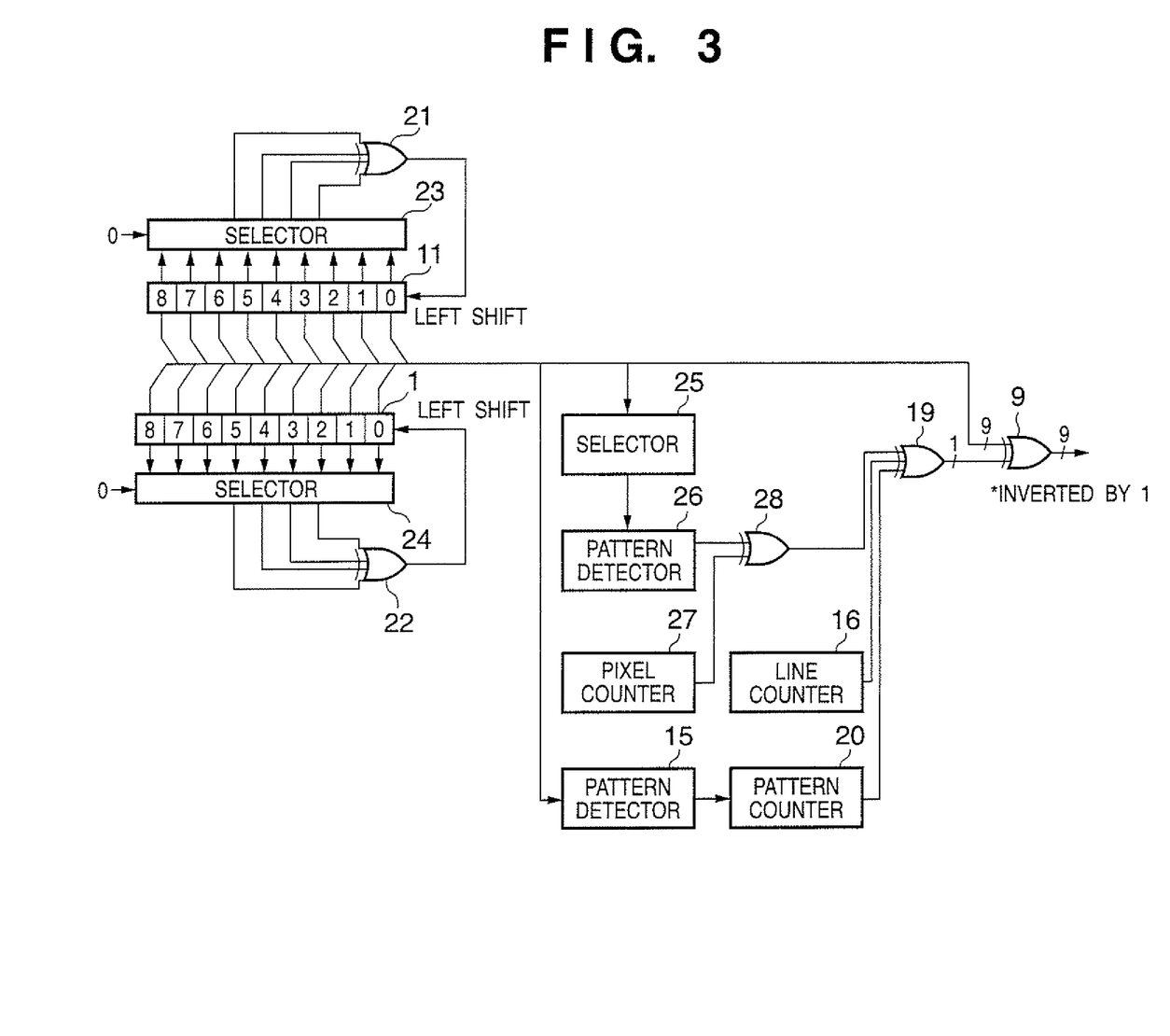
FIG. 3 is a block diagram showing the basic arrangement of a random number generator according to the third embodiment of the present invention.

FIG. 3 is a block diagram showing the basic arrangement of a random number generator according to this embodiment. Note that the same reference numerals in FIG. 3 denote the same parts as in FIGS. 1 and 2, and a description thereof will be omitted. Referring to FIG. 3, reference numerals 21 and 22 denote EXOR circuits; 23, 24, and 25, selectors; 26, a pattern detector; 27, a pixel counter; and 28, an EXOR circuit.

The selector 23 receives 9 bits from the shift register 11, selects a predetermined number of bits equal to or smaller than 9 bits (4 bits in FIG. 3), and inputs them to the EXOR circuit 21. If the number of "1"s of the input bit sequence of 4 bits is an even number, the EXOR circuit 21 outputs 0; if it is an odd number, the EXOR circuit 21 outputs 1. The EXOR circuit 21 inputs the output value to the shift register 11. Since the maximum value of the number of terms except for a "+1" term of primitive polynomials of 9-th order or less is 4, the EXOR circuit 21 suffices to have four inputs. Note that 0 is selected as the remaining input upon selecting three terms, and "0"s are selected as the remaining inputs or the same bits are selected as the remaining input upon selecting two terms.

Likewise, the selector 24 receives 9 bits from the shift register 1, selects a predetermined number of bits equal to or smaller than 9 bits (4 bits in FIG. 3), and inputs them to the EXOR circuit 22. If the number of "1"s of the input bit sequence of 4 bits is an even number, the EXOR circuit 22 outputs 0; if it is an odd number, the EXOR circuit 22 outputs 1. The EXOR circuit 22 inputs the output value to the shift register 1.

The selector 25 extracts a bit sequence for a predetermined number of bits from a bit corresponding to the height order number of a primitive polynomial from the bit sequence of 9 bits from the shift register 1, and inputs the extracted bit sequence to the pattern detector 26.

The pattern detector 26 checks if the bit sequence for a predetermined number of bits input from the selector 25 matches that of a specific pattern. If the bit sequence matches the specific pattern, the pattern detector 26 inputs bit "1" to the EXOR circuit 28; if they do not match, the detector 26 inputs bit "0" to the EXOR circuit 28.

On the other hand, the pixel counter 27 holds 1-bit data, and inverts that bit every time a random number sequence is generated. That is, the pixel counter 27 alternately outputs 0 and 1 like 0, 1, 0, 1, . . . every time a random number sequence is generated. The count value of the pixel counter 27 is input to the EXOR circuit 28.

The EXOR circuit 28 EXORs 1 bit from the pattern detector 26 and 1 bit from the pixel counter 27, and outputs 1 bit as the EXOR result to the EXOR circuit 19. That is, when the bit sequence for the predetermined number of bits input from the selector 25 matches the bit sequence of the specific pattern, the EXOR circuit 28 executes a process for inverting the bit from the pixel counter 27, and outputs the inverted bit to the EXOR circuit 19.

For example, when the values of 4 bits from the highest order are 0101, since the M-sequence random number uses a shift register, the MSBs of the subsequent random numbers are in the order of 0, 1, 0, and 1. The count value of the pixel counter 27 is inverted every time a random number is generated. For example, when the MSBs of the generated random numbers are output in the order of 0, 1, 0, 1, . . . , and these values are inverted, the MSBs of the output random numbers consecutively assume the same values like 0000. This means that the high-frequency component of the random number is modulated to the low-frequency side, and the random number becomes visually readily detectable. Hence, a bit sequence for a predetermined number of bits from the MSB side of the random number is extracted to detect a pattern such as 0101, and the value of the pixel counter 27 is inverted if such pattern is detected, thus preventing the random number from being modulated to the low-frequency side.

Figure 5:
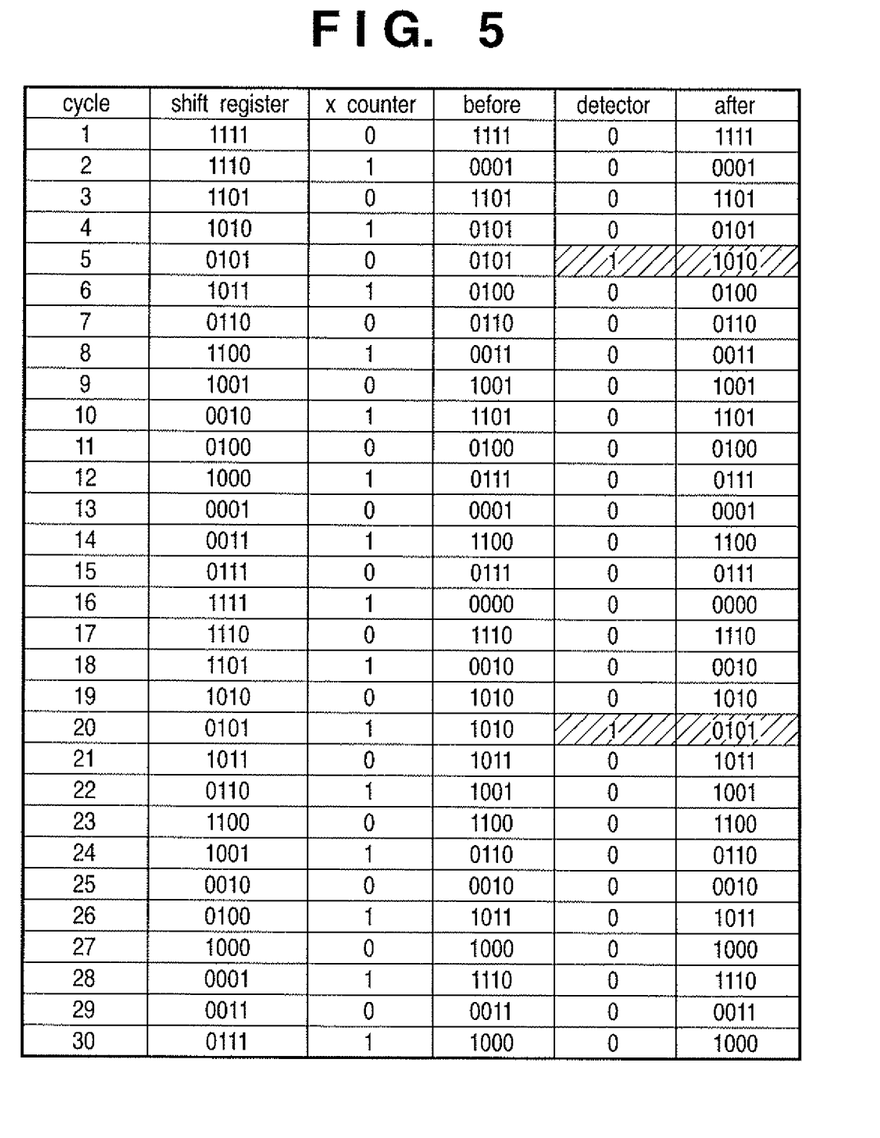
FIG. 5 shows the MSBs of a quartic primitive polynomial $x^4+x+1$.

FIG. 5 shows the MSBs of a quartic primitive polynomial $x^4+x+1$. As shown in FIG. 5, the MSBs from cycles 4 to 8 become zero before change (see a "before" column). However, as can be seen from FIG. 5, upon performing inversion by detecting the "0101" pattern (see an "after" term), a run of "0"s and that of "1"s of the MSBs can be suppressed to 3 or less. Not only in the above primitive polynomial but also in other primitive polynomials, a run of "0"s and that of "1"s of the MSBs can be suppressed to 3 or less. As can be seen from FIG. 5, if "0000" is replaced by "1111", the same values appear twice each in the 30 cycles, uniform random numbers are generated, and the length is doubled. Also, EXNOR may be used in place of EXOR. In this case, "1111" (all bits=1) may be replaced by "0000".

Since the selector 24 is switched in response to the pattern sync signal (the output from the pattern detector 15 or a carry of a $(2^K-1)$-ary counter), a primitive polynomial can be switched to different ones in turn. In this manner, the length can be further extended while maintaining the characteristics of uniform random numbers. Note that the length in the line direction can be extended by switching the selector 23. Since the switching timing at that time can be set while the shift operation of the shift register 11 stops, easy switching is allowed.

The EXOR circuit 19 EXORs all input bits, and inputs 1 bit as its EXOR result to the inverter 9. The subsequent processes are the same as those in the first embodiment.

In this embodiment, the EXOR circuits 21 and 22 have four inputs. However, the present invention is not limited to this, and these EXOR circuits may have, e.g., two inputs. In this case, some primitive polynomials (those of 8th order in this case) cannot be implemented. However, since the number of primitive polynomials which cannot be implemented is small, no serious problem is posed.

Fourth Embodiment

Figure 4:
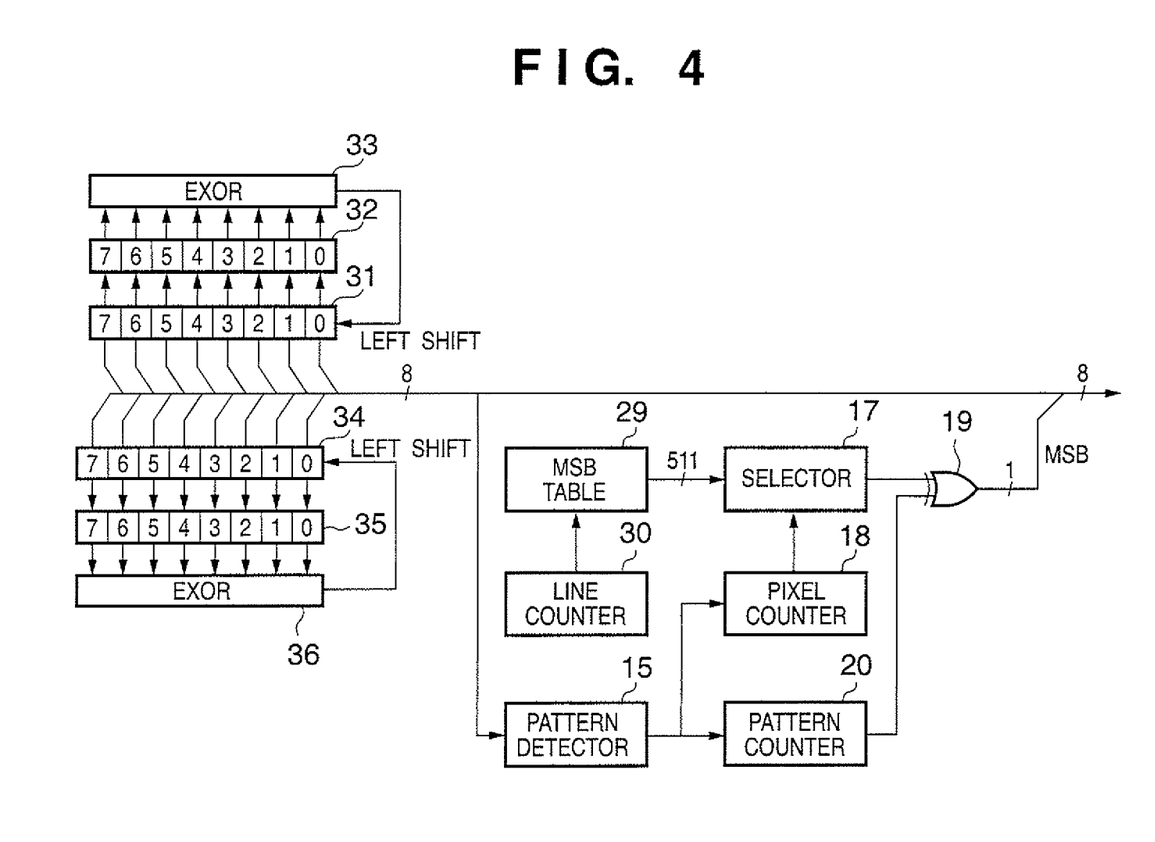
FIG. 4 is a block diagram showing the basic arrangement of a random number generator according to the fourth embodiment of the present invention.

FIG. 4 is a block diagram showing the basic arrangement of a random number generator according to this embodiment. Note that the same reference numerals in FIG. 4 denote the same parts as in FIGS. 2 and 3, and a description thereof will be omitted. Referring to FIG. 4, reference numerals 31 and 34 denote shift registers; 32 and 35, mask circuits; 33 and 36, EXOR circuits; 29, an MSB table; and 30, a line counter.

The process for generating a random number for each line by the LFSR configured by the shift register 31, mask circuit 32, and EXOR circuit 33 is the same as that in the above embodiments. The same applies to the LFSR configured by the shift register 34, mask circuit 35, and EXOR circuit 36. In this embodiment, since the MSB of a random number is generated by modulating the MSB table 29, the number of bits of a bit sequence handled by each LFSR is smaller by 1 bit.

The line counter 30 is used to select a line of the MSB table 29. The line counter 30 is sequentially counted up every time a line is switched as in the line counter 16. When the count value of the line counter 30 reaches the number of lines of the MSB table 29, it is reset to zero to repeat counting for the number of lines of the MSB table 29.

The MSB table 29 two-dimensionally stores the MSBs of random numbers, and one MSB is selected by the line counter 30, pixel counter 18, and selector 17. This selection is made by specifying a column by the line counter 30 and selecting one bit of this column by the pixel counter 18 as in the first embodiment.

The EXOR circuit 19 EXORs 1 bit from the selector 17, and 1 bit output from the pattern detector 15 and pattern counter 20, and outputs 1 bit as an EXOR result. The output one bit is appended to the head of an 8-bit bit sequence from the shift register 31 or 34 as the MSB, thus externally outputting a bit sequence of a total of 9 bits.

With the above arrangement, the size of the MSB table 29 in the pixel direction matches the length of a random number formed by the shift register 34, mask circuit 35, and EXOR circuit 36, and the size of the MSB table 29 in the line direction matches the length of a random number formed by the shift register 31, mask circuit 32, and EXOR circuit 33. Hence, a random number having desired spatial frequency characteristics can be generated.

Fifth Embodiment

The random number generating method described in each of the first to fourth embodiments is implemented by hardware with the arrangement shown in each of FIGS. 1 to 4. Alternatively, a part that serves as a memory may be assured on a RAM of a computer, and other parts except for the part that serves as the memory may be implemented in the form of programs to be executed by a CPU of the computer. That is, the random number generating method described in each of the first to fourth embodiments is implemented by software, and is executed by the computer, so that the computer implements the random number generating method described in each embodiment. In this case, as the arrangement of the computer, a known PC (personal computer), WS (workstation), and the like can be applied. These computers comprise a CPU and RAM, as is well known. Also, other arrangements are not particularly limited.

A method of supplying the program of this software is not particularly limited. As is well known, the program may be loaded from a hard disk drive to the RAM, or the program of the software may be supplied from an external apparatus to the RAM of this computer via a network such as a LAN, Internet, or the like.

Other Embodiments

The objects of the present invention are also achieved when a CPU or MPU of a device such as a camera, printer, or the like reads out and executes a program code from a recording medium (or storage medium), which records a program code of a software program that can implement the functions of the above-mentioned embodiments. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the device such as a camera, printer, or the like, but also by some or all of actual processing operations executed by an operating system (OS) running on the device such as a camera, printer, or the like on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the device such as a camera, printer, or the like, after the program code read out from the recording medium is written in a memory of the extension card or unit.

When the present invention is applied to the recording medium, that recording medium stores program codes corresponding to the aforementioned functional arrangement.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-174607 filed on Jun. 11, 2004, the entire contents of which are hereby incorporated by reference herein.

What is claimed is:

1. A random number generating apparatus, comprising:
a random number generation unit configured to generate an M-sequence random number respectively for each pixel to be processed on an image, wherein the M-sequence random number is expressed by K bits;
a modulation signal generation unit configured to generate an inversion control signal based on a position of the pixel to be processed on the image; and
a modulation unit configured to determine whether or not to perform inversion of each bit of bit values expressing the M-sequence random number which is generated by the random number generation unit for each pixel, based on the inversion control signal, and perform the inversion of each bit of the bit values when determined to perform the inversion, so as to generate random numbers having specific frequency characteristics expressed by K bits.

2. A random number generating apparatus according to claim 1, wherein the random number generation unit further comprises:
a shift register configured to hold a bit sequence of K bits; and
an operation unit configured to perform an exclusive-OR operation using bit values at predetermined bit positions of the bit sequence held by the shift register.

3. A random number generating apparatus according to claim 1, wherein the modulation signal generation unit is further configured to generate the inversion control signal based on horizontal and vertical positions of the pixel to be processed on the image.

4. A random number generating apparatus according to claim 3, wherein the modulation signal generation unit further comprises:
a pattern table configured to hold values in a two-dimensional matrix; and
a selector configured to select a value in the pattern table as the inversion control signal, which value is designated by the horizontal and vertical position of the pixel to be processed on the image.

5. A random number generating apparatus according to claim 2, wherein the shift register is further configured to shift the bit sequence held by the shift register in a predetermined direction, and hold the result of the exclusive-OR operation.

6. A random number generating apparatus according to claim 3, wherein the control signal for one of two horizontally adjacent pixels on the image indicates performing the inversion and the control signal for the other of the two horizontally adjacent pixels on the image indicates not performing the inversion; and
wherein the control signal for one of two vertically adjacent pixels on the image indicates performing the inversion and the control signal for the other of the two vertically adjacent pixels on the image indicates not performing the inversion.

7. A random number generating apparatus according to claim 1, wherein a series of random numbers output from the modulation unit have different absolute values.

8. A random number generating method for a random number generating apparatus comprising one or more processors, comprising the steps of:
generating, the one or more processors, an M-sequence random number respectively for each pixel to be processed on an image, wherein the M-sequence random number is expressed by K bits;
generating, using the one or more processors, an inversion control signal based on a position of the pixel to be processed on the image;
determining, using the one or more processors, whether or not to perform inversion of each bit of bit values expressing the M-sequence random number which is generated, using the one or more processors, for each pixel, based on the inversion control signal; and performing, using the one or more processors, the inversion of each bit of the bit values when determined to perform the inversion, so as to generate random numbers having specific frequency characteristics expressed by K bits.

9. A non-transitory computer readable storage medium storing a program that makes a computer execute a random number generating method of claim 8.

* * * * *